United States Patent [19]

Burns et al.

[11] Patent Number: 4,540,978

[45] Date of Patent: Sep. 10, 1985

[54] BISTATIC PULSE-OVERLAP DOPPLER RADAR INTRUSION DETECTION APPARATUS

[75] Inventors: Bryan L. Burns, Tijeras; Michael W. Callahan, Albuquerque, both of N. Mex.

[73] Assignee: The United States of America as represented by the Secretary of the Air Force, Washington, D.C.

[21] Appl. No.: 447,736

[22] Filed: Dec. 7, 1982

[51] Int. Cl.³ .............................................. G08B 13/18
[52] U.S. Cl. .................................. 340/554; 343/5 PD
[58] Field of Search ............. 340/552, 554; 343/5 PD, 343/5 CF, 7.7, 17.1 PF

[56] References Cited

U.S. PATENT DOCUMENTS

| | | |
|---|---|---|
| 3,471,845 | 10/1969 | Sokoloff ............................ 343/5 PD |
| 3,541,551 | 11/1970 | Bystrom, Jr. et al. ............. 340/552 |
| 3,631,490 | 12/1971 | Palmieri ............................... 343/7.7 |
| 3,688,298 | 8/1972 | Miller et al. ........................ 340/258 |
| 4,027,303 | 5/1977 | Neuwirth et al. ................. 343/5 PD |
| 4,132,988 | 1/1979 | Blacksmith et al. ................ 340/552 |

*Primary Examiner*—Salvatore Cangialosi
*Assistant Examiner*—K. R. Kaiser
*Attorney, Agent, or Firm*—Donald J. Singer; William Stepanishen

[57] ABSTRACT

An intrusion detection apparatus utilizing a plurality of bistatic pulse-overlap Doppler radar units to detect target Doppler frequency shifts in an enclosed sensitive volume and utilizing a single RF frequency with different pulse repetition rates to synchronize the bistatic receiver unit with its associated transmitter unit.

6 Claims, 5 Drawing Figures

BISTATIC PULSE-OVERLAP DOPPLER RADAR INTRUSION DETECTION APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to intrusion security devices, and in particular to a bistatic pulse-overlap Doppler radar for intrusion detection.

In the prior art, electronic detection devices utilizing the Doppler principle have been widely used for some years. Such devices detect a change in received frequency from the transmitted frequency, the difference being the Doppler shift. Whether the frequency shift is positive or negative, it is detected by the detection device after processing by using an integrator, the output of which reaches an alarm threshold level after a period of time which is determined by the energy level that is transferred to the integrator input. While such devices should ignore spurious signals that may be generated by external environmental influences which alter the nature of the received signal, they do not always do so thus resulting in the generation of false alarms.

In the case of frequency discriminating devices of the above type, the detector may not be able to discern between small oscillatory noise or vibration sources and real signals. Sources of this type cause phase jitter on the received signal and can fall within the pass-band of the receiver and which when combined with the appropriate mean phase of the received signal, can cause false alarms. While real signals produce either a positive or negative Doppler shift that are caused by a moving body within the field of the detection devices, false returns that appear to be real signals are accepted by the detection device.

SUMMARY OF THE INVENTION

The present invention utilizes a plurality of bistatic pulsed-doppler radar units which are arranged around the periphery of a security area to form a closed volume. Each of the radar units contains a transmitter and a receiver, each of which communicates with its complement in an adjacent radar unit. Each transmitter/receiver combination of the radar units utilizes the same RF frequency but a different pulse repetition pattern to establish a narrow ellipsoidal beam between radar units which operate on a narrow RF bandwidth.

It is one object of the present invention, therefore, to provide an improved intrusion detection apparatus.

It is another object of the invention to provide an improved intrusion detection apparatus utilizing a plurality of bistatic pulse-overlap Doppler radar units.

It is still another object of the invention to provide an improved intrusion detection apparatus wherein each receiver unit is synchronized with pulses that are received from its associated transmitter unit without using any external cables.

It is yet another object of the invention to provide an improved intrusion detection apparatus wherein synchronization between radar units is achieved in the presence of interferring signals from other transmitters with similar pulse repetition frequencies.

It is a further object of the invention to provide an improved intrusion detection apparatus wherein the receiver unit synchronizes on the direct transmitter-to-receiver pulse and will not synchronize on echoes from nearby large targets.

It is a still further object of the invention to provide an improved intrusion detection apparatus wherein the overlap between the direct transmitter-to-receiver pulse and the target echo is used to detect the target doppler shift.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
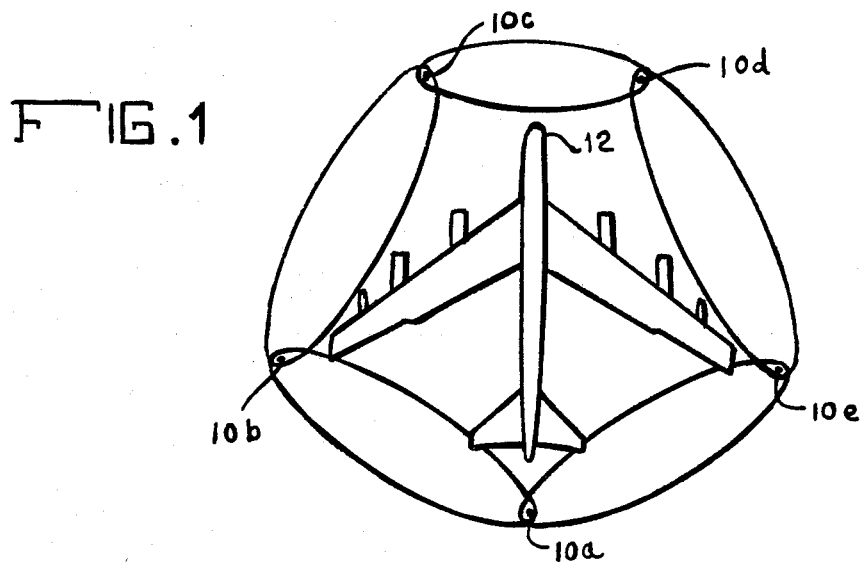
FIG. 1 is a pictorial view of the sensitive volume formed by the intrusion detection apparatus.

Referring now to FIG. 1, there is shown a pictorial view of five bistatic pulsed-doppler radar units 10a-10e which enclose a volume that is occupied by an airplane 12 or other such similar item to be protected. Each of the radar units 10a-10e which position around the aircraft 12 contains a transmitter and a receiver. The receiver in each unit communicates only with its associated transmitter in an adjacent previous unit. In order to make the ellipsoidal sensitive volume between each transmitter and receiver narrow, the radar must use a short (~5 nanosecond) pulse. The RF bandwidth which would be required for this short pulse is very large, so the various different transmitters cannot operate at different frequencies. Therefore, each transmitter has the same RF frequency but a different pulse repetition frequency. It should be noted that the use of the bistatic radar unit principle (wherein the transmitter and receivers are separated) permits the formation of narrow ellipsoidal sensitive volume which can be set up around the perimeter of an aircraft thereby eliminating from the field of detection parts of the aircraft which would be subject to motion by wind force. Elimination of extraneous movement diminishes the cause of most nuisance alarms which plague all alarm systems. The present intrusion detection apparatus is not sensitive to motion of the protected aircraft, and detects all intruders with velocities above 2 cm/s.

The basic radar units in the intrusion detection apparatus synchronizes the bistatic receiver with its associated transmitter and detects target doppler shifts. The pulse-overlap-doppler radar has the following characteristics. Each receiver unit synchronizes with pulses that are received from its associated transmitter using only the transmitter RF signal (i.e., no external cables). The synchronization between the respective receiver unit and transmitter unit is achieved in the presence of interferring signals from other transmitters with similar pulse repetition frequencies. The receiver unit synchronizes on the direct transmitter-to-receiver pulse and will not synchronize on echoes from nearby large targets. The overlap between the direct transmitter-to-receiver pulse and the target echo is used to detect the target doppler shift.

Figure 2:
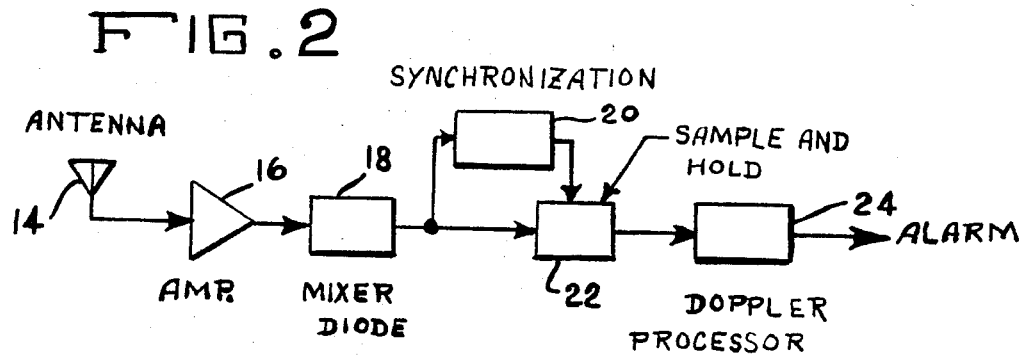
FIG. 2 is a block diagram of the pulse-overlap Doppler receiver apparatus according to the present invention.

Turning now to FIG. 2 there is shown a block diagram of the pulse-overlap Doppler receiver. The overlap-doppler radar pulse signal is received at antenna 14 and is applied to the amplifier unit 16. The output signal from the amplifier unit 16 is applied to a mixer diode unit 18 wherein the overlap-doppler pulse signal is detected. The output from the mixer diode unit 18 is applied to both the synchronization unit 20 and the sample and hold unit 22. The synchronization unit 20 insures that a given receiver unit will only accept and process radar pulse signals from its associated transmitter unit. The output signal from the sample and hold unit 22 is applied to the Doppler processor unit 24 wherein the Doppler pulse signal is processed and an alarm signal is generated if an intrusion into the secured zone has been detected.

Figure 3:
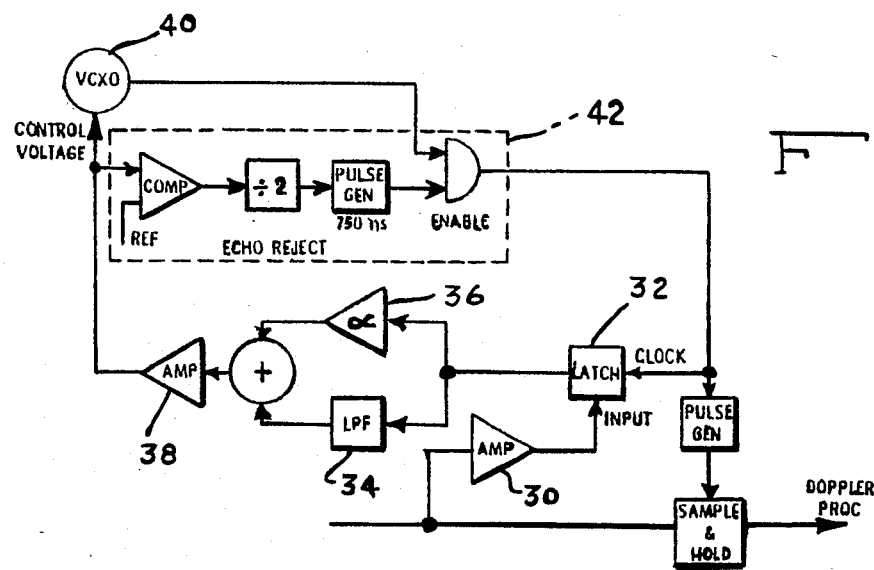
FIG. 3 is a block diagram of the synchronization and echo-rejection circuit.

There is shown in greater detail in FIG. 3 a block diagram of the synchronization and echo rejection circuit of FIG. 2. The input to the synchronization circuit is the output of the mixer diode. For the direct transmitter-to-receiver pulse the mixer diode acts like a square-law detector, and its output is the envelope of the received pulse train. The synchronization circuit is a phase-locked loop with three main elements: a phase detector, a loop filter, and an oscillator. The phase detector comprises a binary latch unit 32 which is used as a hard limiter. A level-shifting amplifier unit 30 adjusts the mixer-diode output so that it is above the latch threshold when a transmitter pulse is present and below the latch threshold otherwise. The latch unit 32 thus puts out one value (a binary 1) when a transmitter pulse is present, and another (a binary 0) when only noise is present. The loop filter comprises a low-pass RC filter unit 34 and a proportional amplifier unit 36 which bypasses a small fraction of the latch output around the filter unit. The combined output y is given by $$y = w + \alpha(x - \bar{x})$$

where
w = RC filter output
α = fraction of input bypassed
x = latch output
$\bar{x}$ = average value of latch high and low levels.

Bypassing a small fraction of the latch output reduces the timing error of the synchronization circuit. An amplifier unit 38 after the loop filter connects the filter output voltage to levels appropriate to the voltage controlled crystal oscillator unit 40 (VCXO). The voltage controlled crystal oscillator (VCXO) no-signal frequency is slightly below the transmitter frequency, so initial synchronization is achieved when the voltage controlled crystal oscillator (VCXO) backs the latch clock signal into the leading edge of the transmitter pulse.

The synchronization circuit cannot lock to other transmitters, which have different pulse repetition frequencies. However, nearby buildings and vehicles can cause echoes which are nearly as large as the direct transmitter-to-receiver pulse, and these echoes have the same pulse repetition frequency. Echoes large enough to allow synchronization can occur as late as 200–300 ns after the direct pulse. Synchronization is achieved by letting the transmitter catch up with the receiver, so the chance of synchronizing on an echo is small. However, synchronization on an echo makes the sensitive volume of the radar much too large and results in nuisance alarms. An echo reject circuit 42 is therefore provided to reject synchronization on echoes. When synchronization is first achieved, as indicated by an increase in voltage controlled crystal oscillator control voltage, the voltage controlled crystal oscillator is disabled for 750 ns. This skips the latch clock past the last possible echo pulse, and when the receiver resynchronizes, it is sure to be locked to the direct pulse from the transmitter. The echo-rejection circuit 42 operates when the receiver first synchronizes after turn-on, and every second time it resynchronizes.

Figure 4:
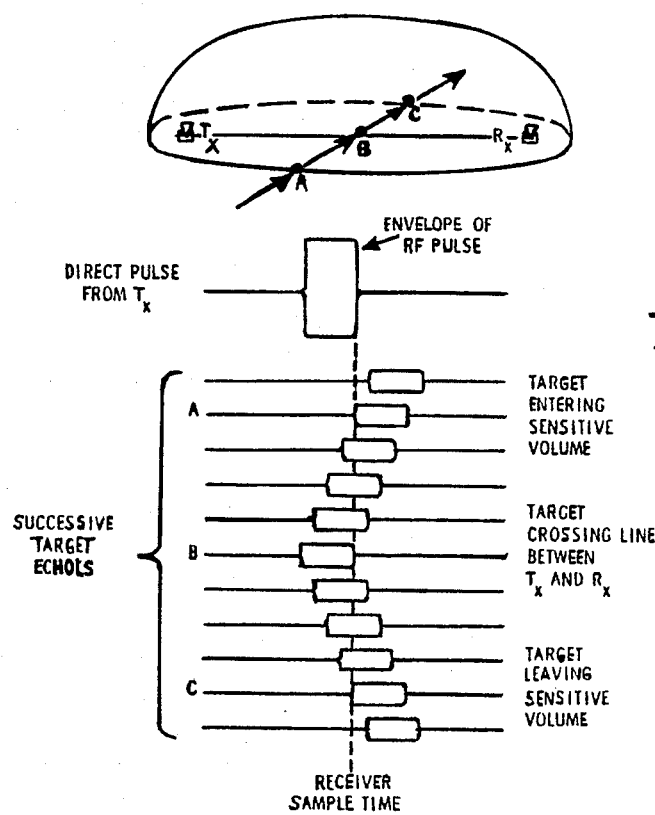
FIG. 4 is a graphical representation of the timing relationship of the direct transmitter to receiver pulse and target echoes for an intruder crossing the radar sensitive volume.
Figure 5:
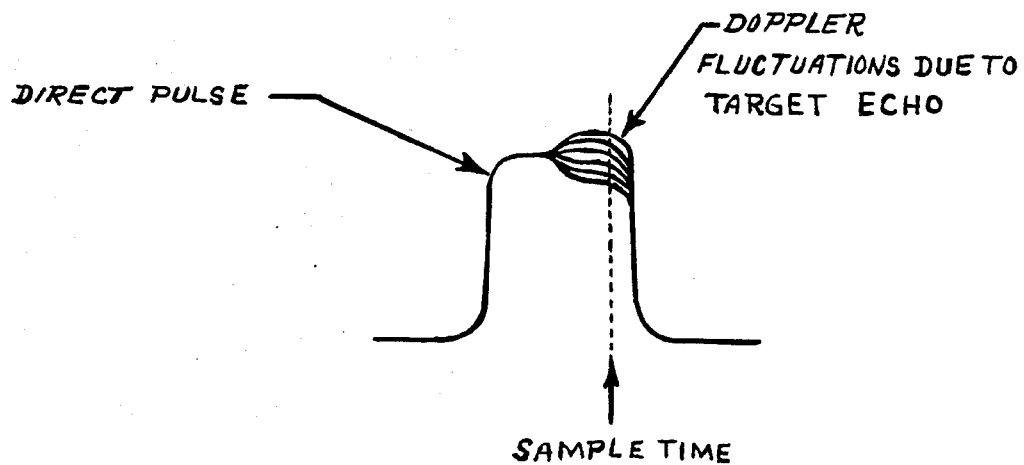
FIG. 5 is a graphical representation of the superposition of several successive pulses for a target about half way into the sensitive volume.

The method of target doppler detection is shown in FIGS. 4 and 5. FIG. 4 shows a sequence of echo pulses for a target crossing the sensitive volume of the radar. As the target enters the sensitive volume, the target echo begins to overlap the direct transmitter-to-receiver pulse. The target echo and direct pulse are multiplied in the mixer diode, producing a doppler component at the same time, as shown in FIG. 5. The doppler fluctuation arises because the phase difference between the direct pulse and the target echo pulse changes as the target moves. The overlap increases until the target reaches the line joining the transmitter and receiver, when the two pulses arrive simultaneously. As the target crosses this line and moves away, the overlap decreases. The doppler processor which separates the fluctuations due to an intruder from the direct pulse and noise is conventional, and is comprised of a doppler filter, detector, RC integrator and alarm threshold.

Although the invention has been described with reference to a particular embodiment, it will be understood to those skilled in the art that the invention is capable of a variety of alternative embodiments within the spirit and scope of the appended claims.

What is claimed is:

1. A bistatic pulse-overlap Doppler radar intrusion detection apparatus comprising in combination:
a plurality of Doppler radar units arranged around the periphery of an area to form an enclosed volume, each of said plurality of Doppler radar units comprising a bistatic pulse-overlap Doppler radar having a transmitter unit and a receiver unit, each transmitter unit in said plurality of Doppler radar units transmitting an RF signal which forms a narrow ellipsoidal sensitive volume to an adjacent receiver unit in said plurality of Doppler radar units, each transmitter unit operating on the same RF frequency but on a different pulse repetition frequency than the adjacent transmitter, each receiver unit receiving and synchronizing on the pulse signal received from its associated adjacent transmitter unit by using only that transmitter's RF signal, said receiver units synchronizing only on the direct transmitter to receiver pulse signals, each receiver unit utilizing the overlap between the direct transmitter to receiver pulse signal and the target echo to detect the target Doppler shift.

2. A bistatic pulse-overlap Doppler radar intrusion detection apparatus as described in claim 1 wherein each receiver unit of said plurality of Doppler radar units comprise in combination:
an antenna means to receive said RF signal, a means for amplifying connected to said antenna means to receive said RF signal therefrom, said amplifying means amplifying said RF signal, a mixer diode means receiving said RF signal from said amplifying means, said mixer diode means operating as a square-law detector, said mixer diode means detecting said RF signal and providing an output pulse signal, a means for synchronization receiving said output pulse signal from said mixer diode means, said synchronization means utilizing said output pulse signal to lock said receiver unit onto the RF signal from its adjacent transmitter unit, said synchronization means generating a synch signal when synchronization is achieved, a sample and hold means receiving said output pulse signal from said mixer diode means, said sample and hold means holding said output pulse signal until said synch signal is received from said synchronization means and then outputting said output pulse signal, and a Doppler processor means to receive said output pulse signal from said sample and hold means, said Doppler processor means processing said output pulse signal to detect a Doppler frequency shift, said Doppler processor unit processing said output pulse signal until a Doppler frequency shift is detected and then generating an alarm signal.

3. A bistatic pulse-overlap Doppler radar intrusion detection apparatus as described in claim 2 wherein said synchronization means comprises a phase-locked loop.

4. A bistatic pulse-overlap Doppler radar intrusion detection apparatus as described in claim 3 wherein said phase-locked loop comprises a phase detector to determine the phase of said output pulse signal, said phase detector passing said output pulse signal when it corresponds with a phase reference signal, a loop filter means to filter and amplify said output pulse signal from said phase detector, said loop filter means generating a synch voltage, and a voltage controlled oscillator to receive said synch voltage from said loop filter means, said voltage controlled oscillator generating a synch signal.

5. A bistatic pulse-overlap Doppler radar intrusion detection apparatus as described in claim 4 wherein said synchronization means includes an echo rejection means to reject unwanted echo signals in said output pulse signal.

6. A bistatic pulse-overlap Doppler radar intrusion detection apparatus as described in claim 5 wherein said plurality of Doppler radar units comprise at least five bistatic Doppler radar units.

* * * * *